United States Patent [19]
Broese et al.

[11] Patent Number: 5,673,368
[45] Date of Patent: Sep. 30, 1997

[54] METHOD AND DEVICE FOR CONDUCTING A PROCESS IN A CONTROLLED SYSTEM WITH AT LEAST ONE PRECOMPUTED PROCESS PARAMETER DETERMINED USING A MATHEMATICAL MODEL HAVING VARIABLE MODEL PARAMETERS ADJUSTED BASED ON A NETWORK RESPONSE OF A NEURAL NETWORK

[75] Inventors: Einar Broese; Otto Gramckow, both of Erlangen; Thomas Martinetz, Munich; Guenter Soergel, Nuremberg, all of Germany

[73] Assignee: Siemens Aktiengesellschaft, Munich, Germany

[21] Appl. No.: 336,952

[22] Filed: Nov. 10, 1994

[30] Foreign Application Priority Data

Nov. 11, 1993 [DE] Germany .............................. 43 38 608.3

[51] Int. Cl.⁶ ...................................................... G05B 13/02
[52] U.S. Cl. ............................... 395/22; 395/23; 395/24; 395/903; 395/906
[58] Field of Search ................................... 395/22, 23, 24, 395/906, 903

[56] References Cited

U.S. PATENT DOCUMENTS 5,513,097  4/1996  Gramckow et al. ...................... 395/903

FOREIGN PATENT DOCUMENTS

| 40 40 360 A1 | 6/1991 | Germany . |
| 41 11 354 A1 | 10/1992 | Germany . |
| 41 30 164 A1 | 3/1993 | Germany . |
| 442459 | 12/1974 | U.S.S.R. . |
| 807211 | 2/1981 | U.S.S.R. . |
| 1794516 A1 | 2/1993 | U.S.S.R. . |

OTHER PUBLICATIONS

Silvestrini, et al., "Autoadaptive process control of a Sendzimir mill at ILVA," *Iron and Steel Engineer*, pp. 50–55 (Aug. 1993).

Sun, et al., "A Hybrid Neural Network Model for Solving Optimization Problems," *IEEE Transactions on Computers*, vol. 42, No. 2, pp. 218–227 (Feb. 1993).

Psaltis et al, "A Multilayered Neural Network Controller", IEEE Control System Magazine, 1988.

*Primary Examiner*—George B. Davis
*Attorney, Agent, or Firm*—Kenyon & Kenyon

[57] ABSTRACT

In known processes for conducting a process in an automatically controlled system, the system is preset at the beginning of each process run based on at least one process parameter. The at least one process parameter is precomputed with a model of the process, containing at least one model parameter and input values supplied to the model. During the process, the input values and the process parameter are measured and used to adaptively improve the precomputed process parameter after the process run. A neural network is used to determine the model parameters whose dependence on the input values is unknown or insufficiently known. Network parameters of the neural network are modified after each process run to adapt the model to the actual process events.

9 Claims, 2 Drawing Sheets

5,673,368

METHOD AND DEVICE FOR CONDUCTING A PROCESS IN A CONTROLLED SYSTEM WITH AT LEAST ONE PRECOMPUTED PROCESS PARAMETER DETERMINED USING A MATHEMATICAL MODEL HAVING VARIABLE MODEL PARAMETERS ADJUSTED BASED ON A NETWORK RESPONSE OF A NEURAL NETWORK

BACKGROUND OF THE INVENTION

The present invention concerns a method for conducting a process in an automatically controlled system. A mathematical model of the process, with at least one variable model parameter, is implemented in a computing means. The mathematical model precomputes at least one selected process parameter, based on the input values supplied to it, for presetting the system before the start of the process. The input values and the process parameter are measured during the process are supplied to the mathematical model after the process run. The precomputed value of the process parameter is adaptively improved based on the measured process parameter and the measured input values. Furthermore, the present invention concerns a device for implementing method for conducting a process.

A method and a device for conducting a quasi-continuous process in an automatically controlled system are discussed in German Patent Application No. 40 40 360. An example of such process is an arrangement of rolling trains, wherein each pass of the rolled product forms a process cycle (hereinafter "a process run"). Like all actual industrial processes, these process runs are time-varying. In conducting such processes, the system controlling the process must be preset before each run. That is, unlike traditional closed-loop control, control must precede the actual process. This is because controlled values can often be measured only indirectly, and not at the point of affection of the process, so that direct closed-loop control is not possible in industrial processes.

The system controlling the process is preset in a known manner by precomputing selected process parameters according to pre-established input values, or initially estimated input values, or both, based on a pool of relevant mathematical models of the process. The system is preset using the precomputed parameters.

Since mathematical models of the process to be conducted can only approximate the actual process, the mathematical model must be adapted to the actual process events. For this, the process parameters and the input values are measured directly or indirectly by precomputing other measured values during each process run. After the process run is completed, the precomputing performed with the mathematical models is repeated within the framework of a postcomputation done based on the input values measured at that time. The variable model parameters are adaptively modified, based on the deviation between the process parameters thus computed and the measured process parameters, to reduce the deviations obtained. The model parameters thus adapted are available at the beginning of the following process run for precomputing the process parameters.

Even when the model describes the industrial process with sufficient accuracy, considerable errors may result from the model parameters when the relationship between the model parameters and the input values is not known.

The goal of the present invention is to improve the precomputed values of the process parameters without using adaptation algorithms for adapting the variable model parameters.

SUMMARY OF THE INVENTION

The method of the present invention achieves this goal by supplying those input values that influence the variable model parameters to a neural network, after the process run, in a process of the aforementioned type. The neural network provides a value for the model parameter as a network response. The network parameters of the neural network are adapted, based on the deviation between the computed result delivered by the model and the measured process parameters, to reduce the deviation. Accordingly, a device for implementing the method of the present invention has a neural network with variable network parameters for adaptively improving the computed results delivered by the model. Measured input values that influence the model parameter are supplied to the input of the neural network, and the network response is supplied to an input of the mathematical model for setting the variable model parameters.

Thus the variable model parameters are determined and adapted by a neural network. Designing and training the neural network is less expensive than qualifying the mathematical model for obtaining an algorithm to adapt the variable model parameters. Compared with the other possible option of replacing the mathematical model entirely with a neural network, using both a neural network and a mathematical model is advantageous because prior results and experience continue to be valid for the mathematical process modeling. Accordingly, using the neural network in combination with the mathematical model is also simpler than a corresponding overall neural network, and provides better present solutions for conducting the process.

The present invention adapts the network parameters on-line by using the measured input values and the measured process parameters after each process run. Thus, the computed values of the variable model parameters are constantly adapted to the actual, i.e., time-variable process. The adapting the network parameters of the neural network on-line uses less computing resources than algorithmically adapting the model parameters of the mathematical model on-line.

When the dependence of the variable model parameters on the input values can be partially described by an algorithm, this portion of the variable model parameters is advantageously computed within the mathematical model based on the estimated or measured input values and only the other portion is produced by the neural network.

The method according to the present invention is particularly well suited for use in processes of the process industries in which the process can be sufficiently described by a model. For example, rolling processes can be advantageously conducted using the method of the present invention. Specifically, the method of the present invention can be used to obtain a cooling time constant as the model parameter for precomputing the temperature variation in the rolled strip, or for obtaining the heat resistance of the rolled strip as the model parameter for precomputing the rolling force, or both.

BRIEF DESCRIPTION OF THE DRAWINGS

The present invention is explained in detail below using the figures of the drawing.

DETAILED DESCRIPTION

Figure 1:
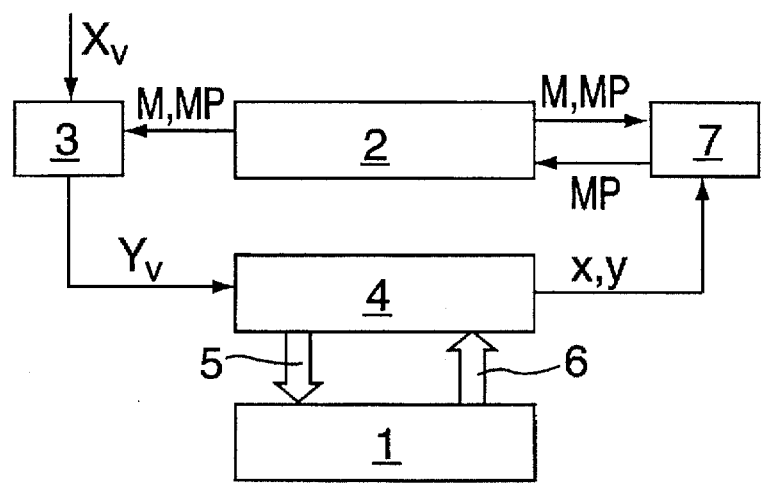
FIG. 1 is a block schematic which shows a known arrangement for conducting an industrial process, which implements a mathematical model of the process for presetting a system controlling the process.

FIG. 1 is a black schematic which shows a conventional arrangement for conducting an industrial process, for example, a rolling process. The industrial process is denoted by a function block 1. A mathematical model M of the process, including the associated variable model parameters MP, is implemented in a computing means 2. Before the beginning of each process run, a precomputing means 3 extracts the necessary model equations of mathematical model M, with the current model parameters MP, from computing means 2. The precomputing means 3 generates selected process parameters $Y_v=(Y_{1v}, \ldots, Y_{mv})$ based on the equations of the mathematical model M and based on the given or estimated input values $x_v=(x_{1v}, \ldots, x_{nv})$, for example, reference values. A system 4 for controlling process 1 is preset with the precomputed process parameters $y_v$.

During the subsequent process run, the process 1 is controlled by preset system 4, as indicated by arrow 5. Also during the process run, all essential process values are measured as shown by arrow 6. Input values x and process parameters y are determined, by statistically preparing the measured values and by computing other values that are not directly measurable, much more accurately than before the process run. After the process run, the input values x thus measured and process parameters y are supplied to a post-computing means 7. The post computing means 7 accesses model M with the current model parameters MP and iterates the precomputation based on the measured input values x. The resulting process parameters are compared with the measured process parameters to determine deviations. The model parameters MP are adaptively modified based on the deviations observed to reduce the deviations. The adapted model parameters MP are stored in computing means 2 for use in the next precomputation. These adapted model parameters MP overwrite the older values.

Figure 2:
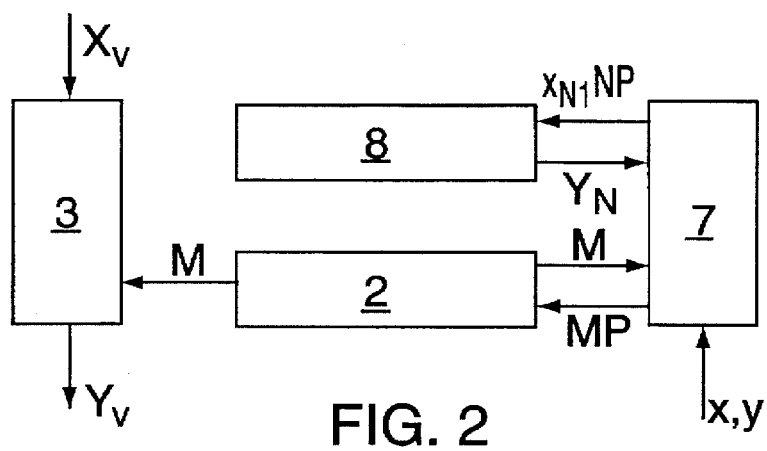
FIG. 2 is a block schematic which shows an example for combining the mathematical model with a neural network according to the present invention.

FIG. 2 is a block schematic which shows an example of a device, according to the invention, for combining the mathematical model in computing means 2 with a neural network 8. As in the known example illustrated in FIG. 1, precomputing means 3 uses the mathematical model M in the computing means 2 to precompute process parameters $Y_v$. After the process run, those input values that influence the variable model parameters MP are supplied to neural network 8. The network response $Y_N$ of the neural network 8 is received by postcomputing means 7. Postcomputing means 7 also receives, from computing means 2, mathematical model M, whose variable model parameters MP are determined again by network response $Y_N$. Measured input values x, destined for mathematical model M, are supplied to mathematical model M where the computed result is compared with measured process parameters y to determine deviations. Depending on the deviations, network parameters NP of neural network 8 are adaptively modified to reduce the deviation.

Figure 3:
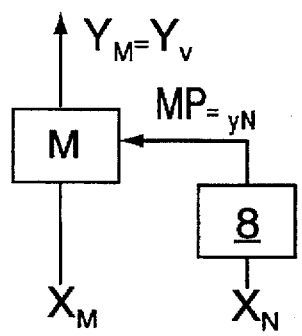
FIG. 3 is a block diagram illustrating the linking of the neural network the mathematical model.

FIG. 3 is a block schematic which shows the combination of mathematical model M with neural network 8. Based on input values $x_M$ supplied to it, the mathematical model M produces computed result $Y_M$, which corresponds to process parameter $Y_v$ to be precomputed. The input of the neural network is supplied with input values $X_n$. Variable model parameters MP of model M are determined by network response $Y_N$ of neural network 8. Input vectors $x_M$ and $x_N$ for the mathematical model M and for the neural network 8, respectively, are, in principle, different.

Figure 4:
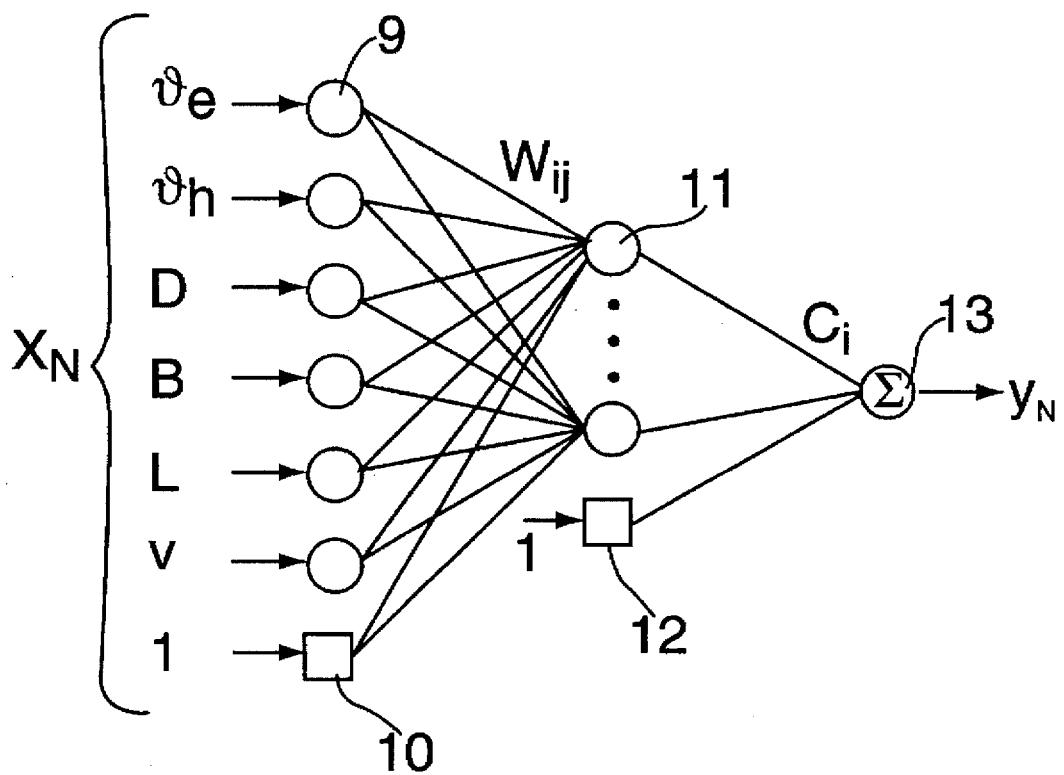
FIG. 4 shows an example a neural network used for the method of the present invention.

FIG. 4 shows an example of a neural network that can be used to obtain a variable model parameter of a mathematical model. In the instant example, the mathematical model M serves as a model for cooling a thin strip in the cooling area of a rolling mill. Cooling can be described with the equation:

$$v(t)=v_u+(v_e-v_u).\exp(-t/T),$$

where v(t) is the temperature variation in the strip, $v_e$ is the exit strip temperature, and $v_u$ is the ambient temperature. T denotes the cooling time constant, which, among other things, depends on the strip thickness, temperature conductivity, heat conductivity, heat transfer coefficient for the top face of the strip and the heat transfer coefficient for the bottom face of the strip. Except for the strip thickness, no exact values are available for these parameters. Therefore, the cooling time constant T can only be determined or estimated within the framework of the model. If the estimated value of the cooling time constant is denoted with T*, the actual cooling time constant T can be defined as T=k.T*, where k represents a model parameter whose dependence on any input values is unknown. The neural network illustrated in FIG. 4 computes this model parameter k and adapts it to the actual process events. The final roll temperature $v_e$, reel temperature $v_h$, strip thickness D, strip width B, the sum of alloy portions L in the strip and strip speed v are supplied to the neural network.

The back propagation type neural network has an input layer with one input element 9 for each of input values $x_n(v_e, \ldots, v)$. Furthermore, an additional input element 10, supplied with a constant value, e.g. "1", is provided. The input layer is coupled with a concealed layer including a plurality of elements 11. Each element 11 of the concealed layer has a response characteristic in the form of a sigmoid curve between −1.0 and +1.0. Each of the input values $x_N$ supplied to the input layer is multiplied by individual weighting factors $W_{ij}$ in each element 11 of the concealed input and then added up before weighting with the sigmoid variation. The concealed layer has another element 12, which serves as an input element for a constant value, e.g., "1." The responses of elements 11 and 12 are weighted with individual weighting factors $C_i$. An output element 13 is connected with the concealed layer and sums the weighted responses of elements 11 and 12 of the concealed layer to form network response $Y_N$.

Network parameters $w_{ij}$ and $c_i$ are adapted on-line after each process run in a known manner using the least squares method, modifying the network parameters stepwise to reduce the error.

What is claimed is:

1. A method for controlling a process with a controlling means and a computing means, the computing means having a mathematical model of the process, the mathematical model having at least one variable process model parameter, and with a neural network having variable network parameters, the method comprising steps of:

a) supplying input variables to the computing means;
    b) precomputing, before each process run, at least one selected process parameter based on the input variables supplied to the computing means;
    c) presetting the at least one process parameter;
    d) measuring input values and process parameters during a process run, wherein the process run is controlled by the controlling means;

e) supplying the measured input values and process parameters to the mathematical model;

f) adaptively improving the precomputed process parameters based on the measured input values and process parameters, the step of adaptively improving the precomputed process parameters including sub-steps of:

i) supplying input values that influence the at least one variable process model parameter to the neural network after the process run, ii) providing a value for the at least one variable process model parameter as a network response with the neural network, iii) comparing the precomputed at least one process parameter with the measured process parameters to form a deviation, and iv) adapting the network parameters of the neural network such that the deviation is reduced.

2. The method of claim 1 wherein the network parameters are adapted on-line using, after each process run, the measured input values and the measured process parameters for adapting the network parameters.

3. The method of claim 1 wherein the at least one variable process model parameter includes:

a first portion computed with the mathematical model based on the input values, and a second portion, determined with the neural network, and linked with the first portion.

4. The method of claim 3 wherein the input values are estimated input values.

5. The method of claim 3 wherein the input values are measured input values.

6. The method of claim 1 wherein the process includes a number of rolling processes.

7. The method of claim 6 wherein a cooling constant is used as a model parameter for precomputing a temperature variation of a rolled strip.

8. The method of claim 6 wherein a heat resistance of the rolled strip is used as a model parameter for precomputing rolling force.

9. An arrangement for conducting a process in a control system, the arrangement comprising:

a) a computing means, including a mathematical model of the process, the mathematical model having a model parameter, for precomputing at least one process parameter based on input values;

b) means for presetting the control system based on the at least one precomputed process parameter;

c) means for measuring the input values and the process parameters during the process, the process being conducted under the control of the control system; and d) a neural network, the neural network being capable of performing the steps of:

i) having variable network parameters, ii) adaptively improving the process parameter precomputed by the computing means, iii) supplied with input values that influence the model parameter; and iv) providing a network response to the mathematical model for setting the model parameter.

* * * * *